(12) United States Patent
Ishida (10) Patent No.: US 12,141,718 B2
(45) Date of Patent: Nov. 12, 2024

(54) RENTAL SPACE INFORMATION PROCESSING DEVICE

(71) Applicant: TAISHO SKY BUILDING, INC., Tokyo (JP)

(72) Inventor: Kazuharu Ishida, Tokyo (JP)

(73) Assignee: TAISHO SKY BUILDING, INC., Tokyo (JP)

( * ) Notice: Subject to any disclaimer, the term of this patent is extended or adjusted under 35 U.S.C. 154(b) by 150 days.

(21) Appl. No.: 17/454,061

(22) Filed: Nov. 8, 2021

(65) Prior Publication Data
US 2022/0058534 A1 Feb. 24, 2022

Related U.S. Application Data

(63) Continuation of application No. PCT/JP2019/018358, filed on May 8, 2019.

(51) Int. Cl.
*G06Q 10/02* (2012.01)
*G06F 16/178* (2019.01)
(Continued)

(52) U.S. Cl.
CPC ........... *G06Q 10/02* (2013.01); *G06F 16/178* (2019.01); *G06Q 30/0637* (2013.01);
(Continued)

(58) Field of Classification Search
CPC ...... G06Q 10/00; G06Q 10/02; G06F 16/178; G06F 16/27
(Continued)

(56) References Cited

U.S. PATENT DOCUMENTS 10,657,465 B2 *  5/2020  Bigourdan ............. G06Q 10/02
11,100,734 B2 *  8/2021  Ahn .................... G06K 19/0723
(Continued)

FOREIGN PATENT DOCUMENTS

CN    105701548 A    6/2016
CN    106205205 A    12/2016
(Continued)

OTHER PUBLICATIONS

"Smartphones replace room keys at select Starwood hotels," by Nancy Trejos, USA Today, Jan. 29, 2014 (Year: 2014).*
(Continued)

*Primary Examiner* — Jeff Zimmerman
*Assistant Examiner* — Brian Adams Heflin
(74) *Attorney, Agent, or Firm* — MORGAN, LEWIS & BOCKIUS LLP (57) ABSTRACT

A reservation system receives, at a first of a plurality of customer attraction servers, customer attraction side reservation information of a user including a reservation date and time; manages, at a management server management side reservation information of the user who uses the rental space and the reservation date and time; obtains, at an information processing device, an update of the customer attraction side reservation information from the first customer attraction server; and synchronizes, at the information processing device, customer attraction side reservation information in a second of the plurality of customer attraction servers based on the update of the customer attraction side reservation information obtained from the first customer attraction server.

3 Claims, 3 Drawing Sheets

(51) Int. Cl.
*G06Q 30/0601* (2023.01)
*G06Q 30/0645* (2023.01)
*G07C 9/00* (2020.01)

(52) U.S. Cl.
CPC ..... *G06Q 30/0645* (2013.01); *G07C 9/00182* (2013.01); *G07C 2009/00253* (2013.01)

(58) Field of Classification Search
USPC .......................................................... 705/5
See application file for complete search history.

(56) References Cited

U.S. PATENT DOCUMENTS

| | | | |
|---|---|---|---|
| 2006/0015376 A1* | 1/2006 | Sattler | G06Q 10/109 |
| | | | 705/5 |
| 2011/0099038 A1* | 4/2011 | Nishida | G06Q 10/02 |
| | | | 705/5 |
| 2014/0136250 A1 | 5/2014 | Lee | |
| 2014/0236478 A1* | 8/2014 | Mermelstein | G01C 21/3679 |
| | | | 701/454 |
| 2015/0199863 A1* | 7/2015 | Scoggins | G07C 9/28 |
| | | | 340/5.25 |
| 2017/0118323 A1* | 4/2017 | Kim | H04M 1/72412 |
| 2018/0108192 A1* | 4/2018 | Ho | G07C 9/253 |
| 2019/0035009 A1 | 1/2019 | Williams et al. | |
| 2020/0174767 A1* | 6/2020 | Hashimoto | G06F 9/44505 |
| 2022/0253926 A1* | 8/2022 | Ishida | G06Q 30/06 |

FOREIGN PATENT DOCUMENTS

| | | | |
|---|---|---|---|
| CN | 106897781 A | | 6/2017 |
| CN | 107134167 A | | 9/2017 |
| CN | 107480799 A | | 12/2017 |
| JP | 2002150178 A | * | 5/2002 |
| JP | 2002-259850 A | | 9/2002 |
| JP | 2008-234381 A | | 10/2008 |
| JP | 2009-093411 A | | 4/2009 |
| JP | 2010-073175 A | | 4/2010 |
| JP | 2013-015926 A | | 1/2013 |
| JP | 2014-148875 A | | 8/2014 |
| JP | 2018156197 A | * | 10/2018 |

OTHER PUBLICATIONS

Taisho Sky Building, Inc. International Search Report and Written Opinion, PCT/JP2019/018358, Aug. 6, 2019, 20 pgs.
Japanese Office Action mailed on Oct. 29, 2019 for the corresponding Japanese Patent Application No. 2019-553143, 12 pgs.
Office Action issued on Mar. 16, 2021 for the corresponding Taiwanese Patent Application No. TW109114794, 6 pgs.
Office Action issued on Sep. 27, 2021 for the corresponding Taiwanese Patent Application No. 109114794, 4 pgs.
Machine Translation of CN105701548A (Year: 2016).
Machine Translation of CN106205205A (Year: 2016).
Machine Translation of CN106897781A (Year: 2017).
Machine Translation of CN107134167A (Year: 2017).
Machine Translation of CN107480799A (Year: 2017).
Machine Translation of JP2002-259850A (Year: 2002).

* cited by examiner

Figure 3

RENTAL SPACE INFORMATION PROCESSING DEVICE

RELATED APPLICATIONS

The present application is a continuation of International Patent Application No. PCT/JP2019/018358, filed May 8, 2019, which is hereby incorporated by reference in its entirety.

TECHNICAL FIELD

This disclosure relates to a rental space information processing device that sets a sets a usage time and rents a space to a user.

BACKGROUND

A system for renting empty conference rooms of a building (e.g., an office, a hotel, or the like) to users typically includes a management server open to a communication network such as the Internet, and a plurality of reservation servers in which information on the conference room is stored. Such a system is typically configured so that users can access information describing the conference room in a reservation server via the management server and reserve a desired conference room. Such a system also typically has a billing function so that a rental fee can be paid online.

Although reservation and payment can be made in advance from the user via the communication network, it is not assumed that reservations from a plurality of customer attraction sites (customer attraction servers) are received. Therefore, when duplicate reservations with similar conditions are received from the customer attraction sites, a load for processing the reservations on the management server will increase, and processing errors such as double booking may occur. Further, it is also conceivable to increase processing capacity of the management server in order to deal with increase in load, but system configuration is complicated and costs required for initial capital investment and maintenance increases.

SUMMARY

An object of the present disclosure is to provide an information processing device for a reservation system (also referred to as a rental space), which can increase reliability of the reservation while suppressing a processing load of a management server.

Implementations of an information processing device for a reservation system (also referred to as a rental space) as described herein include an information processing device for a rental space, which sets a usage time and rents a space to a user, the information processing device being connected via a communication line to a management server for managing information of the rental space and a plurality of customer attraction servers for attracting users of the rental space, in which the customer attraction server includes a customer attraction side reservation part that is connected to a user input unit that receives information input to the customer attraction server via the communication line, and manages customer attraction side reservation information on the user and a reservation date and time, which has been received via the user input unit, the management server includes a management side reservation part that manages management side reservation information on the user who uses the rental space and the reservation date and time, and the information processing device includes: an information obtaining unit that obtains an update of the customer attraction side reservation information in the customer attraction server and an update of the management side reservation information in the management server; and a synchronization control unit that synchronizes the customer attraction side reservation information in the customer attraction server with the management side reservation information in the management server on the basis of the customer attraction side reservation information and the management side reservation information obtained by the information obtaining unit.

In some implementations, the information processing device for the rental space is connected to the management server and the customer attraction servers via the communication line, the information obtaining unit obtains the update of the customer attraction side reservation information in the customer attraction server, which has been received via the user input unit, and the update of the management side reservation information in the management server, and the synchronization control unit synchronizes the customer attraction side reservation information with the management side reservation information. In this way, the information processing device includes the synchronization control unit that synchronizes the customer attraction side reservation information in the customer attraction servers with the management side reservation information in the management server, so that it is possible to prevent double booking of reservations for the rental space. Therefore, it is not necessary for the management server and the customer attraction server to synchronize the reservation information with each other, processing loads of the servers can be suppressed, and the reservation information is synchronized by the synchronization control unit of the information processing device, so that it is possible to prevent the processing errors and increase the reliability of the reservation.

In some implementations, the information processing device further includes a key issuing unit that issues an unlocking key for unlocking a locking device of the space to be rented to the user who uses the rental space when the update of the customer attraction side reservation information is obtained.

With such a configuration, in the information processing device, the key issuing unit issues the unlocking key for unlocking the locking device of the space to be rented on the basis of the update of the customer attraction side reservation information, so that it is possible to issue the unlocking key to the user even for the reservation from the customer attraction server that does not meet specifications of the locking device of the space to be rented, thereby attracting a wide range of users regardless of key issuance specifications of the customer attraction servers.

In some implementations, the information processing device further includes: a billing amount obtaining unit for obtaining a billing amount of the rental space reserved via the customer attraction server; and a billing amount counting unit for counting the billing amount obtained by the billing amount obtaining unit.

With such a configuration, in the information processing device, the billing amount obtaining unit obtains the billing amount of the rental space reserved via the customer attraction server, and the billing amount counting unit counts the obtained billing amount, so that an administrator of the rental space can be aware of the billing amount for each customer attraction server, and can be aware of a total billing amount of the rental space.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Hereinafter, implementations of the present disclosure will be described with reference to the drawings.

Figure 1:
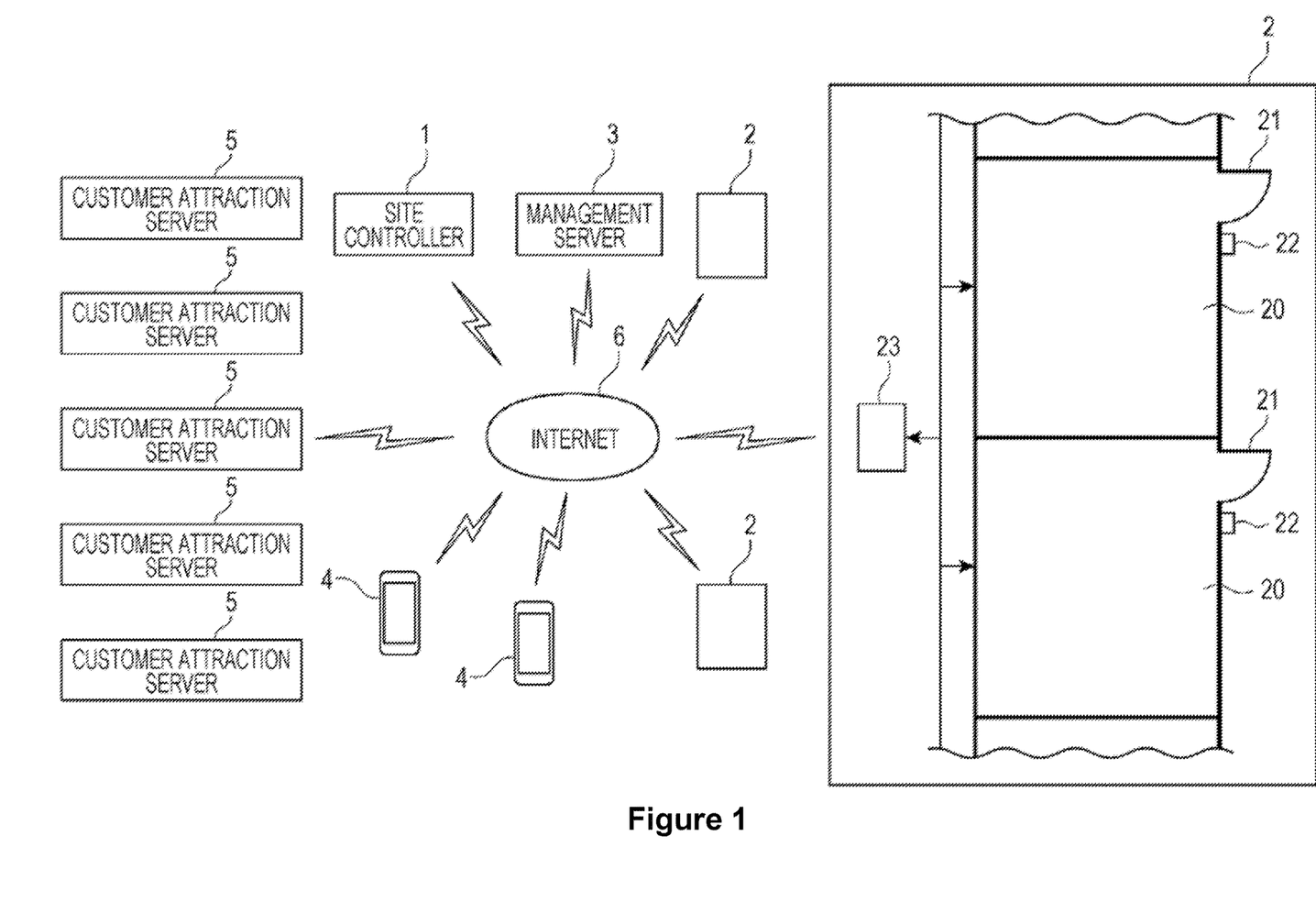
FIG. 1 is a schematic configuration diagram of an information processing device for a rental space in accordance with some implementations.

FIG. 1 is a schematic configuration diagram of an information processing device for a rental space in accordance with some implementations.

As illustrated in FIG. 1, the information processing device for the rental space is a site controller 1, and is connected to a management server 3 for managing information of a room 20 as a space of a building 2 which is the rental space, and a plurality of customer attraction servers 5 that attract users of the rental space, via the Internet 6 which is a public network as a communication line. There are a plurality of the buildings 2, each of which has a plurality of the rooms 20 for renting to the users. The customer attraction server 5 and a terminal device 4 such as a mobile phone, a smartphone, or a personal computer owned by the user can be connected to each other via the Internet 6. The user can access an arbitrary customer attraction server 5 via the Internet 6 using the terminal device 4 as a user input unit, search for a room 20 according to a purpose, specify a usage time and the number of users, and make a reservation. The customer attraction server 5 receives room information and billing conditions and the like of the room 20 that can be rented from the management server 3 and the site controller 1, discloses the room information and the billing information, and transmits reservation information to the site controller 1 and the management server 3 when receives the reservation from the user.

The building 2 includes the rooms 20 such as a conference room and a training room, and each room 20 is provided with a doorway 21 and a locking device 22 for locking and unlocking the doorway 21. As will be described below, the locking device 22 can be unlocked by an unlocking key such as a password or a bar code issued from the site controller 1 to the terminal device 4 of the user, and this unlocking key is randomly changed each time it is used, so that only the user who has made a reservation for that time can unlock the locking device 22 by using a unique unlocking key. A communication terminal device 23 such as a modem or a router is connected to the locking device 22 of each room 20 via a local area network (LAN), and the communication terminal device 23 is connected to the management server 3 via the Internet 6.

In some implementations, the password, the bar code or the like is employed as the unlocking key, however, for example, biometric authentication such as face authentication, fingerprint authentication, or retinal authentication may be employed, and any unlocking key may be used as long as it can unlock the locking device 22.

Figure 2:
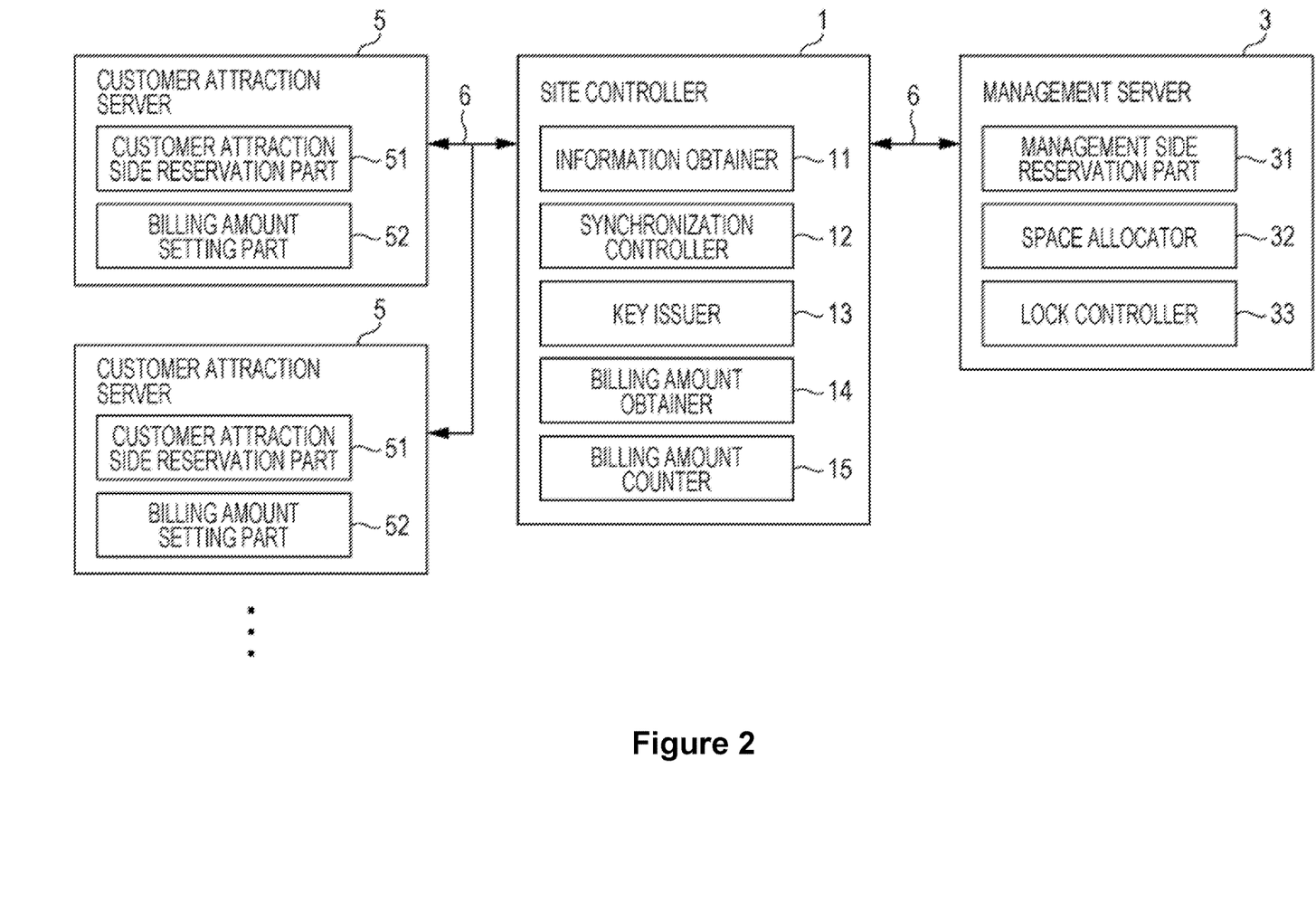
FIG. 2 is a block diagram illustrating a configuration of the information processing device for the rental space in accordance with some implementations.

FIG. 2 is a block diagram illustrating a configuration of the information processing device for the rental space in accordance with some implementations.

The site controller 1, which is the information processing device for the rental space, includes a server device having a controller including a central processing unit (CPU) and the like, and as illustrated in FIG. 2, includes an information obtainer 11 that obtains the reservation information from the management server 3 and the customer attraction server 5, a synchronization controller 12 that synchronizes the reservation information between the management server 3 and the customer attraction server 5, a key issuer 13 that issues the unlocking key for unlocking the locking device 22 of the room 20 to be rented to the user, a billing amount obtainer 14 that obtains a billing amount of the rental space set in the customer attraction server 5, and a billing amount counter 15 that counts the billing amount obtained by the billing amount obtainer 14. Further, although not illustrated, the site controller 1 includes a storage unit for storing various information, a communication unit for communicating with the management server 3 and the customer attraction server 5, an input unit for an administrator to input settings, and the like.

The management server 3 includes a server device having a controller including a central processing unit (CPU) and the like, and includes a management side reservation part 31 that manages management side reservation information on the user who uses the rental space and a reservation date and time, a space allocator 32 that allocates the room 20 to be rented on the basis of the management side reservation information, and a lock controller 33 that controls the locking device 22 of the room 20 to be rented according to the unlocking key issued by the key issuer 13 of the site controller 1. Further, although not illustrated, the management server 3 includes a storage unit for storing various information, a communication unit for communicating with the site controller 1 and the customer attraction server 5, an input unit for the administrator to input the settings, and the like. The management server 3 communicates with the site controller 1 via the Internet 6, transmits and receives the room information, the reservation information, the billing conditions, unlocking key information, and the like, and communicates with the communication terminal device 23 of the building 2, to transmit and receive a control signal of the locking device 22.

The customer attraction server 5 includes a server device having a controller including a central processing unit (CPU) and the like, and discloses the room information and the billing information of the room 20 that can be rented of the rental space, and receives the reservation from the terminal device 4 of the user via the Internet 6. The customer attraction server 5 includes a customer attraction side reservation part 51 that manages customer attraction side reservation information on the user and the reservation date and time, which has been received, and a billing amount setting part 52 that sets the billing amount of the room 20 that has received the reservation. In addition, although not illustrated, the customer attraction server 5 includes a storage unit for storing various information, a communication unit for communicating with the site controller 1 and the terminal device 4 of the user, an input unit for the administrator to input the settings, and the like. The customer attraction server 5 communicates with the terminal device 4 of the user via the Internet 6, to transmit and receive the reservation information and the billing information, and communicates with the site controller 1, to transmit and receive the room information, the reservation information, and the like.

Note that functions of the site controller 1, the management server 3, and the customer attraction server 5 may be executed as a program by the CPU of the server device, may be configured by independent devices, or may be configured using cloud computing. Further, the storage unit may be configured by the storage device such as a hard disk drive (HDD), or may use a storage unit of a cloud service. Further, the terminal device 4 that functions as the user input unit may be a device such as a smartphone including an input unit that receives input from the user, a display for notifying the user of information, a communicator for transmitting and receiving information to and from the customer attraction server 5, and a controller that controls the input unit, the display, the communicator, and the like, or may be a device in which the input unit, the display, the communicator, and the controller are configured by independent devices.

Figure 3:
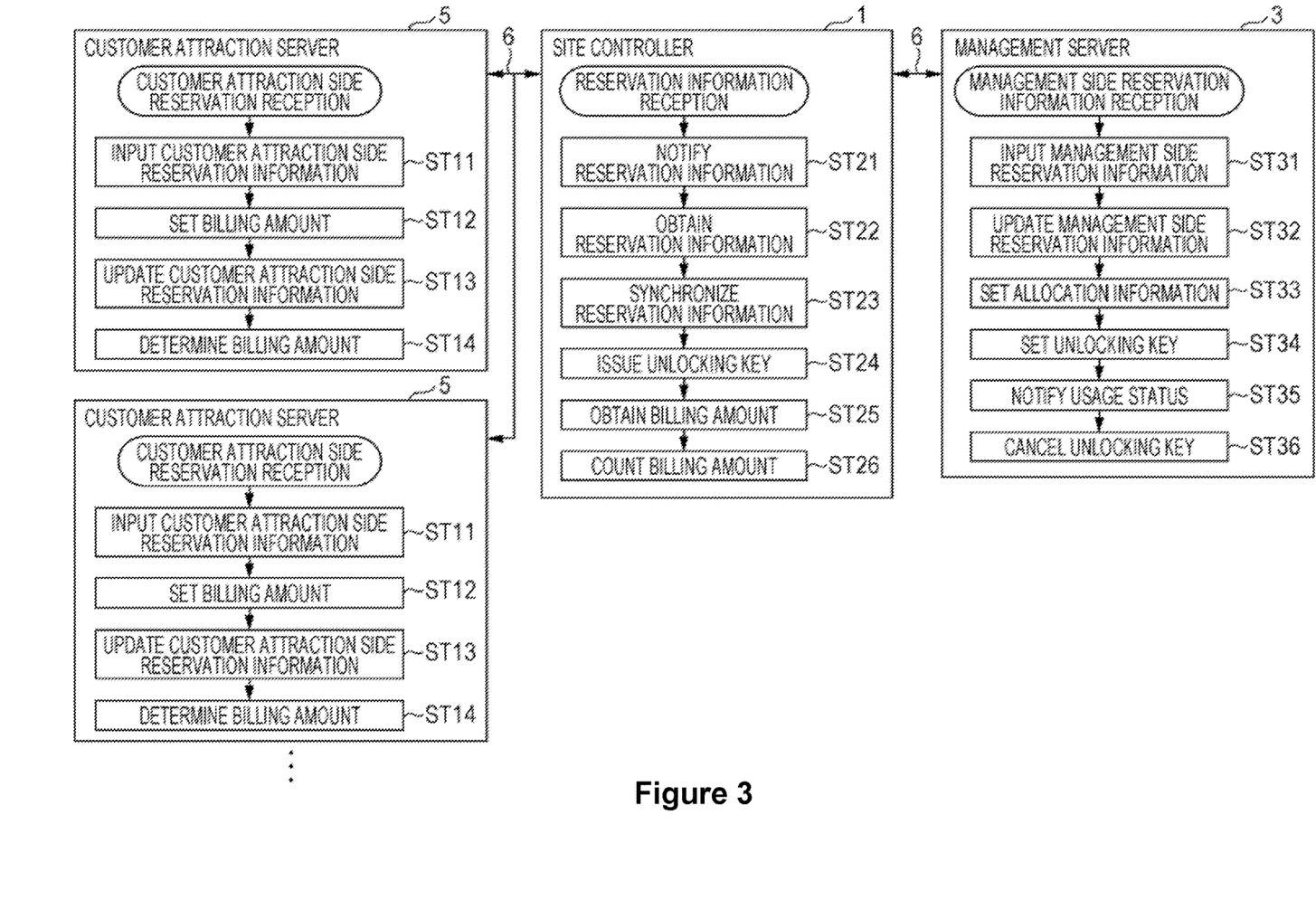
FIG. 3 is a flowchart illustrating an operation of the information processing device for the rental space in accordance with some implementations.

FIG. 3 is a flowchart illustrating an operation of the information processing device for the rental space in accordance with some implementations.

The flowchart of FIG. 3 illustrates an operation procedure of the customer attraction server 5, the site controller 1, and the management server 3 after receiving a new reservation by a user. First, when any one of the customer attraction servers 5 receives a reservation from a terminal device 4 of a user via the Internet 6, the customer attraction side reservation part 51 causes the storage unit to store the customer attraction side reservation information including the user, the number of users, and date and time of use, and transmits the reservation information to the site controller 1 (customer attraction side reservation information input step: Step ST11). Further, in the customer attraction server 5, the billing amount setting part 52 sets the billing amount on the basis of the customer attraction side reservation information and the billing conditions, and transmits the billing amount together with the customer attraction side reservation information to the terminal device 4 of the user (billing amount setting step: Step ST12).

When the information obtainer 11 receives the reservation information from the customer attraction server 5, the site controller 1 transmits the reservation information to the management server 3, and the customer attraction servers 5 other than the customer attraction server 5 that has received the reservation (reservation information notification step: Step ST21). When the management server 3 receives the reservation information from the site controller 1, the management side reservation part 31 causes the storage unit to store the reservation information as the management side reservation information (management side reservation information input step: Step ST31). Further, when the other customer attraction servers 5 receive the reservation information from the site controller 1, the customer attraction side reservation part 31 causes the storage unit to store the reservation information as the customer attraction side reservation information (customer attraction side reservation information input step: Step ST11). Thus, the customer attraction side reservation information stored in all the customer attraction servers 5 and the management side reservation information stored in the management server 3 match.

Subsequently, when the customer attraction server 5 receives a reservation change from the terminal device 4 of the user, the customer attraction side reservation part 51 updates the customer attraction side reservation information by causing the storage unit to store the customer attraction side reservation information, and transmits an update of the customer attraction side reservation information to the site controller 1 (customer attraction side reservation information update step: Step ST13). Here, if there is a change in the billing amount, the customer attraction server 5 may re-execute the billing amount setting step (Step ST12) to reset the billing amount. When the site controller 1 obtains the update of the customer attraction side reservation information in the customer attraction server 5 (reservation information obtaining step: Step ST22), the synchronization controller 12 synchronizes the updated customer attraction side reservation information with the management side reservation information in the management server 3 and the customer attraction side reservation information in the other customer attraction servers 5, and transmits the reservation information to the management server 3 and the other customer attraction servers 5 (reservation information synchronization step: Step ST23).

When the management server 3 receives the updated reservation information from the site controller 1, the management side reservation part 31 updates the reservation information by causing the storage unit to store the reservation information as the management side reservation information (management side reservation information update step: Step ST32). When the other customer attraction servers 5 receive the updated reservation information from the site controller 1, the customer attraction side reservation part 51 updates the reservation information by causing the storage unit to store the reservation information as the customer attraction side reservation information (customer attraction side reservation information update step: Step ST13). Thus, even when the reservation information is updated in the customer attraction server 5, the customer attraction side reservation information stored in all the customer attraction servers 5 and the management side reservation information stored in the management server 3 match.

On the other hand, when the reservation information is updated in the management server 3, in the management server 3, the management side reservation part 31 updates the reservation information by causing the storage unit to store the reservation information as the management side reservation information, and transmits an update of the management side reservation information to the site controller 1 (management side reservation information update step: Step ST32). When the site controller 1 obtains the update of the management side reservation information in the management server 3 (reservation information obtaining step: Step ST22), the synchronization controller 12 synchronizes the updated management side reservation information with the customer attraction side reservation information in all the customer attraction servers 5, and transmits the reservation information to all the customer attraction servers 5 (reservation information synchronization step: Step ST23). When all the customer attraction servers 5 receive the updated reservation information from the site controller 1, the customer attraction side reservation part 51 updates the reservation information by causing the storage unit to store the reservation information as the customer attraction side reservation information (customer attraction side reservation information update step: Step ST13). Thus, even when the reservation information is updated in the management server 3, the management side reservation information stored in the management server 3 and the customer attraction side reservation information stored in all the customer attraction servers 5 match.

In some implementations, although the management server 3 does not receive the new reservation, it may be configured to receive the new reservation. In this case, the site controller 1, the management server 3, and the customer attraction server 5 operate in the same manner as when the reservation information is updated in the management server 3 as described above, and it is configured such that the management side reservation information stored in the management server 3 and the customer attraction side reservation information stored in all the customer attraction servers 5 match.

The reservation change is received as described above until a predetermined reservation changeable time limit, and the customer attraction side reservation information and the management side reservation information are updated, and thereafter when the reservation is established after the reservation changeable time limit has passed, the management server 3 sets the allocation information of the room 20 to be rented by the space allocator 32 on the basis of the established management side reservation information, and transmits the set allocation information to the site controller 1 (allocation information setting step: Step ST33). Specifically, the space allocator 32 selects the room 20 that is vacant on the date and time of use and has a size suitable for the number of users from all the rooms 20 that can be rented, and sets the allocation information to allocate the selected room 20. Note that in the management server 3, the allocation information setting step (Step ST33) is not limited to a step in which it is executed after the reservation changeable time limit has passed and the reservation is established, and it may be executed at any time when the new reservation is received or the reservation change is received. On the other hand, when the site controller 1 receives the allocation information, the key issuer 13 issues the unlocking key for unlocking the locking device 22 of the room 20 to be rented, and transmits the unlocking key in association with the reservation information to the terminal device 4 of the user and the management server 3 (unlocking key issuing step: Step ST24).

Subsequently, when the usage time on a usage day approaches (for example, 10 minutes before a usage start time), the management server 3 causes the lock controller 33 to control the locking device 22 of the room 20 to be rented to be unlockable on the basis of the unlocking key received from the site controller 1 (unlocking key setting step: Step ST34). Thus, the user can unlock the locking device 22 of the room 20 by using the unlocking key received from the site controller 1 to the terminal device 4. The management server 3 detects a usage status by the user of the room 20 using a motion sensor or the like (not illustrated), and when the user leaves the room after the usage time, the management server 3 notifies the site controller 1 that the user has left the room (usage status notification step: Step ST35). Here, for example, if the room 20 continues to be used even if the usage time based on the reservation information is exceeded, an excess time is notified to the site controller 1. The site controller 1 transmits the excess time to the customer attraction server 5 to update the customer attraction side reservation information. When the user finishes using the room 20 and it is confirmed that the user has left the room, the management server 3 cancels the unlocking key of the locking device 22 of the room 20 to disable unlocking of the locking device 22 by the lock controller 33 (unlocking key cancellation step: Step ST36), which prevents re-entry into the room 20.

After using the room 20, the customer attraction server 5 that received the reservation related to the use determines the billing amount on the basis of the billing amount set in the billing amount setting step (Step ST12) and the billing amount set again after adding the excess time when there is a time excess (billing amount determination step: Step ST14). Further, the customer attraction server 5 transmits the determined billing amount as the billing amount in association with the reservation information to the terminal device 4 of the user, and transmits the determined billing amount to the site controller 1. In the site controller 1, the billing amount obtainer 14 obtains the billing amount in association with the reservation information from the customer attraction server 5, and causes the storage unit to store the billing amount (billing amount obtaining step: Step ST25). Further, in the site controller 1, the billing amount counter 15 counts the billing amount obtained by the billing amount obtainer 14, for each predetermined period (for example, one week or one month) (billing amount counting step: Step ST26). That is, since the billing amount is individually set in the customer attraction servers 5 and is set for each reservation for the rooms 20 of the buildings 2, the billing amount obtainer 14 of the site controller 1 obtains the billing amount from the customer attraction servers 5, and the billing amount counter 15 counts the billing amount, so that the billing information for the predetermined period can be collected for each room 20.

According to some implementations, the following operations and effects can be obtained.

(1) The site controller 1 for the rental space is connected to the management server 3 and the customer attraction servers 5 via the Internet 6, the information obtainer 11 obtains the update of the customer attraction side reservation information in the customer attraction server 5, which is received via the terminal device 4 of the user, and the update of the management side reservation information in the management server 3, and the synchronization controller 12 synchronizes the management side reservation information with the customer attraction side reservation information. In this way, the site controller 1 includes the synchronization controller 12 that synchronizes the customer attraction side reservation information in all the customer attraction servers 5 with the management side reservation information in the management server 3, so that it is possible to prevent double booking of reservations for the room 20 of the rental space. Therefore, it is not necessary for the management server 3 and the customer attraction server 5 to synchronize the reservation information with each other, processing loads of the servers can be suppressed, and the reservation information is synchronized by the synchronization controller 12 of the site controller 1, so that it is possible to prevent processing errors and increase reliability of the reservation.

(2) In the site controller 1, the key issuer 13 issues the unlocking key for unlocking the locking device 22 of the room 20 to be rented on the basis of the update of the customer attraction side reservation information, so that it is possible to issue the unlocking key to the user even for the reservation from the customer attraction server 5 that does not meet specifications of the locking device 22 of the room 20 to be rented, thereby attracting a wide range of users regardless of key issuance specifications of the customer attraction servers 5.

(3) In the site controller 1, the billing amount obtainer 14 obtains the billing amount of the rental space reserved via the customer attraction server 5, and the billing amount counter 15 counts the obtained billing amount, so that the administrator of the rental space can be aware of the billing amount for each customer attraction server 5, and can be aware of a total billing amount of the rental space.

(4) The space allocator 32 of the management server 3 automatically allocates the appropriate room 20 from all the rooms 20 that can be rented on the basis of the reservation information, so that it is possible to reduce labor costs compared to a case where the room 20 is manually allocated, and when the reservation is received or when the reservation is changed, the allocation information can be updated immediately.

Modified Implementations

Note that the present disclosure is not limited to the above implementations, and modifications, improvements and the like within the range in which the object of the present disclosure can be achieved are included in the present disclosure.

For example, in the above implementations, a case in which the room 20 of building 2 is rented as the rental space is exemplified, but the rental space is not limited to the conference room, the training room and the like, and may be a tennis court, a baseball field, a stadium, a parking lot or the like, which is an outdoor space, or a karaoke room, a rental office, a reading space or the like.

In the above implementations, a case where the site controller 1 as the information processing device includes the server device connected to the management server 3 and the customer attraction servers 5 via the Internet 6 which is the communication line is exemplified, but the information processing device is not limited to that including such a centralized management type server device. That is, the information processing device may be a distributed management type device, for example, a device using a distributed transaction ledger typified by blockchain can be used, and any device that can transmit and receive and process the reservation information, the billing information, and various commands can be used. Further, in the above implementations, the site controller 1 as the information processing device, the management server 3, and the customer attraction server 5 are separately provided and connected to each other via the Internet 6, but are not limited to this, and the site controller 1, the management server 3, and the customer attraction server 5 may be provided in a single site, or the function of the information processing device and the function of any of the management server 3 and the customer attraction server 5 may be implemented by a plurality of devices distributed on the Internet.

In the above implementations, the site controller 1 includes the key issuer 13, the billing amount obtainer 14, and the billing amount counter 15, but the functions may be omitted, may be provided in the management server 3, or may be provided in any of the customer attraction servers 5. Further, the billing amount obtainer 14 and the billing amount counter 15 are not limited to those that automatically obtain and count the billing amount, and the billing amount may be manually counted by the administrator or the like. Further, in the above implementations, the management server 3 includes the space allocator 32 and the lock controller 33, but the functions may be omitted or may be provided in the server provided in the building 2. Further, although the space allocator 32 automatically updates the allocation information, the room 20 may be manually allocated by the administrator or the like without automatically allocating the room 20 by the space allocator 32. Furthermore, the space allocated to the reservation is not limited to the space in one building 2, and the space of another building 2 existing in the vicinity may be allocated. As such another building 2, an owner and an administrator may be the same or different, and it may be an operation form in which a plurality of owners (administrators) cooperates to rent the space of the building 2.

Further, in the above implementations, the user who applies for the reservation from the terminal device 4 which is the user input unit may be an organizer of the lecture or the seminar, or a participant who participates in the lecture, the seminar or the like. Further, when recruiting participants through the customer attraction server 5 or the like for a reserved existing reservation in which the organizer (user) newly applies and the reservation information is stored, the customer attraction server 5 may receive the information input from the participant (new user) who applies for participation, and update the reservation information (the number of people information, and the like) on the basis of the information input. At this time, an upper limit of the number of users that can be changed may be set in advance to limit the number of new participants recruited. With such a configuration, the organizer who received the participation application does not need to input the change of the number of people, the customer attraction server 5 directly receives the participation application from the participant and updates the number of people information, and the site controller 1 synchronizes the reservation information with the management server 3, so that it is possible to reduce time and effort of the organizer in reservation input.

As described above, the present disclosure can be suitably used for the information processing device for the rental space that can increase the reliability of the reservation while suppressing the processing load of the management server.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A reservation system, comprising:
   a management server configured to manage information of a rental space;
   a plurality of customer attraction servers configured to attract users of the rental space and receive customer attraction side reservation information from terminal devices associated with one or more users of the rental space; and an information processing device distinct from the management server and the plurality of customer attraction servers and connected via a communication network to the management server and the plurality of customer attraction servers;

wherein:
- a first customer attraction server of the plurality of customer attraction servers is configured to receive and manage customer attraction side reservation information of a user including a reservation date and time;
- the management server is configured to manage management side reservation information of the user who uses the rental space and the reservation date and time; and
- the information processing device includes a synchronization controller that is configured to:
  (i) obtain a first user-submitted reservation change from the first customer attraction server generating updated customer attraction side reservation information,
  (ii) transmit the updated customer attraction side reservation information to: (a) all of the plurality of customer attraction servers other than the first customer attraction server and (b) the management server, causing (a) customer attraction side reservation information in all of the plurality of customer attraction servers other than the first customer attraction server and (b) management side reservation information in the management server to be synchronized with (c) the updated customer attraction side reservation information in the first customer attraction server without requiring any of the plurality of customer attraction servers to synchronize any information directly with the management server;
- the information processing device is further configured to, when obtaining the updated customer attraction side reservation information from the first customer attraction server:
  - issue an unlocking key for unlocking a locking device of the rental space; and
  - transmit the unlocking key in association with the updated customer attraction side reservation information to (i) one or more of the terminal devices and (ii) the management server; and
- the management server is further configured to:
  - cause a lock controller to control the locking device of the rental space to be unlockable by the one or more terminal devices on the basis of the unlocking key received from the information processing device; and
  - upon determining that the rental space is unoccupied, cancel the unlocking key to disable unlocking of the locking device by the lock controller.

2. The reservation system of claim 1, wherein the information processing device is further configured to:
- obtain a second user-submitted reservation change from the management server generating updated management side reservation information; and
- transmit the updated management side reservation information to all of the plurality of customer attraction servers, causing customer attraction side reservation information in all of the plurality of customer attraction servers to be synchronized with the updated management side reservation information in the management server.

3. The reservation system of claim 1, wherein the information processing device is further configured to:
- obtain a billing amount of the rental space reserved via the first customer attraction server; and
- count the billing amount obtained by the information processing device.

* * * * *